(12) United States Patent
Fritskey et al.

(10) Patent No.: US 11,333,273 B2
(45) Date of Patent: May 17, 2022

(54) HYBRID FLUID-FLOW FITTING ASSEMBLY

(71) Applicant: Voss Industries LLC, Cleveland, OH (US)

(72) Inventors: John F. Fritskey, Strongsville, OH (US); May Danhash, Sherman Oaks, CA (US); Dale Gordon, Orange, CA (US); David Beddome, Irvine, CA (US)

( * ) Notice: Subject to any disclaimer, the term of this patent is extended or adjusted under 35 U.S.C. 154(b) by 0 days.

(21) Appl. No.: 16/010,450

(22) Filed: Jun. 16, 2018

(65) Prior Publication Data

US 2018/0363812 A1    Dec. 20, 2018

Related U.S. Application Data

(60) Provisional application No. 62/521,478, filed on Jun. 18, 2017.

(51) Int. Cl.

| | |
|---|---|
| *F16L 13/14* | (2006.01) |
| *C22F 1/00* | (2006.01) |
| *F16L 15/00* | (2006.01) |
| *F16L 41/02* | (2006.01) |
| *F16L 13/00* | (2006.01) |
| *B21C 37/29* | (2006.01) |
| *B21D 26/037* | (2011.01) |

(52) U.S. Cl.
CPC ............ *F16L 13/147* (2013.01); *B21C 37/29* (2013.01); *C22F 1/006* (2013.01); *F16L 13/004* (2013.01); *F16L 15/00* (2013.01); *F16L 41/021* (2013.01); *B21D 26/037* (2013.01); *F16L 2201/00* (2013.01)

(58) Field of Classification Search
CPC ....... F16L 13/147; F16L 15/00; F16L 41/021; F16L 13/004; F16L 2201/00; B21C 37/29; C22F 1/006; B21D 26/037; Y10T 29/49865; Y10T 29/49908
USPC ....... 285/381.1, 381.2, 381.3; 148/402, 426; 29/447, 505
See application file for complete search history.

(56) References Cited

U.S. PATENT DOCUMENTS

| | | | | |
|---|---|---|---|---|
| 2,507,859 | A | * | 5/1950 | Keller .................. B21C 37/292 29/890.15 |
| 4,149,911 | A | * | 4/1979 | Clabburn ................ C22F 1/006 148/402 |
| 4,198,081 | A | * | 4/1980 | Harrison ............... F16L 13/004 148/402 |

(Continued)

*Primary Examiner* — Sarang Afzali
(74) *Attorney, Agent, or Firm* — Ryder, Mazzeo & Konieczny LLC; Joseph M. Konieczny, Sr.

(57) ABSTRACT

A hybrid fluid-flow assembly having a base fitting that has been formed by axial load bulge forming from a sheet of metal, and a custom fitting that has been machined from a shaped-memory alloy. At least one connection port of the custom fitting is connected to at least one connection port of the base fitting by an interference fit. The interference fit is formed by cooling the custom fitting to a temperature below its transition temperature, deforming the custom fitting so that the diameter of its connection port is slightly larger than the connection port on the base fitting, installing the connection port of the custom fitting on the connection port of the base fitting, and allowing the custom fitting to warm to room temperature. The shaped-memory alloy swages and coins the outer surface of the base fitting at the interface of the ports, thereby forming a compressive, interference fit.

11 Claims, 5 Drawing Sheets

(56) References Cited

U.S. PATENT DOCUMENTS

| | | | | |
|---|---|---|---|---|
| 4,773,680 A * | 9/1988 | Krumme | ............... | B23P 11/025 |
| | | | | 285/340 |
| 5,174,616 A * | 12/1992 | Hagio | ................... | F16L 13/004 |
| | | | | 228/56.3 |
| 5,687,995 A * | 11/1997 | Mori | ..................... | F16L 13/004 |
| | | | | 156/86 |
| 6,637,110 B2 * | 10/2003 | Jee | ........................ | F16L 13/004 |
| | | | | 285/381.1 |
| 7,774,916 B2 * | 8/2010 | Jee | ........................ | B23P 11/025 |
| | | | | 285/381.1 |
| 8,002,314 B2 * | 8/2011 | Meyzaud | .............. | F16L 41/021 |
| | | | | 285/133.11 |
| 8,286,701 B2 * | 10/2012 | Schultz | ................... | E21B 17/07 |
| | | | | 166/242.6 |
| 8,622,439 B2 * | 1/2014 | His | ......................... | C10G 9/16 |
| | | | | 285/381.1 |

* cited by examiner

HYBRID FLUID-FLOW FITTING ASSEMBLY

CROSS-REFERENCE TO RELATED APPLICATIONS

This nonprovisional patent application claims priority to U.S. provisional patent application No. 62/521,478, filed Jun. 18, 2018 entitled Hybrid Fluid-Flow Fitting Assembly, which is incorporated herein by reference.

FIELD OF THE INVENTION

The present invention relates to a hybrid assembly of fluid-flow fittings that comprise different materials and/or have been made using different manufacturing methods, which are connected in a unique manner.

BACKGROUND OF THE INVENTION

A fitting is used in fluid-flow systems to connect tubing sections, adapt to different sizes or shapes and for other purposes, such as regulating (or measuring) fluid flow. Some common fluid-flow fittings include elbows, couplings, unions, reducers, tees, crosses and caps. In addition to domestic and commercial plumbing, fittings for carrying oil, air, water and fuel are commonly used in many industries, including aircraft and other turbine-based engines.

In prior art applications where weight is not an issue, fluid-flow fittings are often machined from forgings of various material. Fittings machined from forgings are typically heavy because much of the forged material remains after machining. While the added weight reduction from additional machining may justify the added cost in the aircraft and aerospace industries, it would be desirable to provide a method of making a lightweight fitting for universal use that is more efficient than machining from forgings.

Fittings machined from cast forgings have other shortcomings. For example, the internal flow path of such fittings is not smooth, which can create a turbulent or interrupted flow path. Also, such fittings only often have one attachment style/structure (e.g. threading) due to the fact that the fitting is machined from the specific forging. Therefore, it would be desirable to provide a fitting assembly having a smooth flow path and a variety of attachment styles/structures.

Axial-load bulge forming ("ALBF") is a known technique for manufacturing complex products, such as aircraft, jet engine, and other aerospace components, which cannot be produced cost effectively by conventional methods such as hydroforming, stamping, drop hammer forming, or spinning. ALBF can be used to produce complex shapes from thin-walled sheet with minimal material thin-out. While ALBF may be useful for making some fittings, such as reducers, tees, crosses, or wyes, ALBF cannot be used to make some other necessary fittings such as threaded nipples or unions, which require much heavier wall thicknesses. Therefore, it would be desirable to provide a method of making a fitting assembly having both lightweight, thin-walled components and thick-walled components.

Common, ALBF fittings such as reducers, tees, crosses, or wyes, are often combined with a variety of other fittings. It is costly to produce and stock a large number of common ALBF fittings having a variety of different types and sizes of connectors integrally formed or connected thereto. Rather than stocking such a large number and variety of common ALBF fittings, it has been proposed to stock a limited number of "standard" ALBF, thin-walled fittings, which can be connected by a customer by welding or swaging to more "customized" fittings/connectors. However, connecting ALBF and customized fittings can be difficult for several reasons. The legs of thin-walled, ALBF fittings can have a non-uniform wall thickness, which makes them difficult to weld. The legs of these base fittings are often short, which makes them difficult to connect to prior art swage fittings. The legs of these base fittings are often out-of-round, which makes it difficult to obtain a leak-free connection. ALBF and customized fittings are often made from different materials, which also makes them difficult to weld. Therefore, it would be desirable to provide a method of easily and reliably connecting a customized fitting to a standard, thin-walled fitting made by ALBF.

SUMMARY OF THE INVENTION

The present invention provides a hybrid assembly of fluid-flow fittings that comprise different materials and/or have been made using different manufacturing methods. The individual fittings are connected in a unique manner that overcomes some difficulties in the prior art. In one preferred embodiment, the assembly comprises the combination of a standard or base ALBF fitting and an SMA fitting, which can be used to connect another fluid-flow element such as tubing to the ALBF fitting. In another preferred embodiment, the assembly comprises the combination of a standard or base ALBF fitting and an SMA fitting, which can be used to connect another standard fitting to the ALBF fitting. A variety of ALBF and SMA fittings can be provided in a kit so that the user can combine the fittings in a plurality of hybrid assemblies, which are customized for a particular application.

In one preferred embodiment, the hybrid fluid-flow assembly generally comprises base, fluid-flow fitting connected to a custom fluid-flow fitting. The base fitting preferably has been formed by axial load bulge forming from a sheet or tube of thin metal. The base fitting has an input port, at least one output port, and a fluid-flow channel connecting said input and output ports. The custom fitting has preferably been machined from a cast, shaped-memory alloy. The custom fitting has a parent shape, a martensitic shape, an output port, an input port having an inner diameter in its martensitic shape slightly larger than the outer diameter of the output port of the base fitting, and a fluid-flow channel connecting the input and output ports. The input port of the custom fitting is connected to the output port of the base fitting by an interference fit, preferably in its parent condition.

The novel connection method accommodates the condition wherein at least one output port of the base fitting was out-of-round prior to forming the interference fit. The novel connection method also accommodates other adverse connection conditions of the prior art such as where the base fitting and custom fitting are made from materials that are not weldable together, where traditional swage fittings cannot be used, or where the wall thickness is too thin to weld.

In another preferred embodiment, a fluid-flow assembly kit comprises a base fluid-flow fitting and a plurality of custom fluid-flow fittings as previously described. The input port of the custom fitting is connected to the output port of the base fitting by an interference fit. The plurality of custom fittings may have different output ports so that the user can customize the assembly for a particular application. The plurality of custom fittings have been cooled to and deformed at a temperature below their transition temperature. To prevent the custom fittings from returning to their parent shape, the kit includes means for storing the custom fittings below their transition temperature.

In a further preferred embodiment, a method of making a custom fluid flow assembly comprises the steps of forming a base fluid flow fitting from a sheet of metal, machining a custom fluid-flow fitting from a cast shaped-memory alloy, and creating a mechanical connection between the base fitting and the custom fitting by installing the input port of the custom fitting over an output port of the base fitting. The fittings are constructed as described above. Preferably, the mechanical connection is created by deforming the custom fitting at a temperature below its transition temperature, installing the custom fitting on the output port of the base fitting, and heating the custom fitting to form an interference fit between the ports. In one preferred method, the mechanical connection is created by deforming the custom fitting at a temperature far below room temperature and below its transition temperature, installing the custom fitting on the output port of the base fitting, and allowing the custom fitting to warm to room temperature.

The use of an SMA fitting eliminates the need for welding or crimping. The compressive force of the SMA fitting returning to its parent shape swages and/or coins the outer surface of the base fitting. The compressive force can compress an out-of-round port on the base fitting back to round, and can compress any surface defects, to ensure that a leak free seal is formed between the custom fitting and base fitting.

DETAILED DESCRIPTION OF PREFERRED EMBODIMENTS

For the purpose of illustrating the invention, several embodiments of the invention are shown in the accompanying drawings. However, it should be understood by those of ordinary skill in the art that the invention is not limited to the precise arrangements and instrumentalities shown therein and described below. Throughout the specification, like reference numerals are used to designate like elements. Numerous changes and modifications within the spirit and scope of the invention will become apparent to those skilled in the art from this detailed description.

Unless otherwise defined, all technical and scientific terms used herein in their various grammatical forms have the same meaning as commonly understood by one of ordinary skill in the art to which this invention belongs. As used herein, the term "shape-memory alloy" ("SMA"), also known as smart metal, memory metal, memory alloy, muscle wire, and smart alloy, is an alloy that returns to its original ("parent"), pre-deformed shape after the temperature of the deformed shape is raised above its transition temperature. As used herein, the term "transition temperature" means the temperature range over which an SMA transitions fully from the austenitic phase to martensitic phase, and the reverse transformation.

Figure 1:
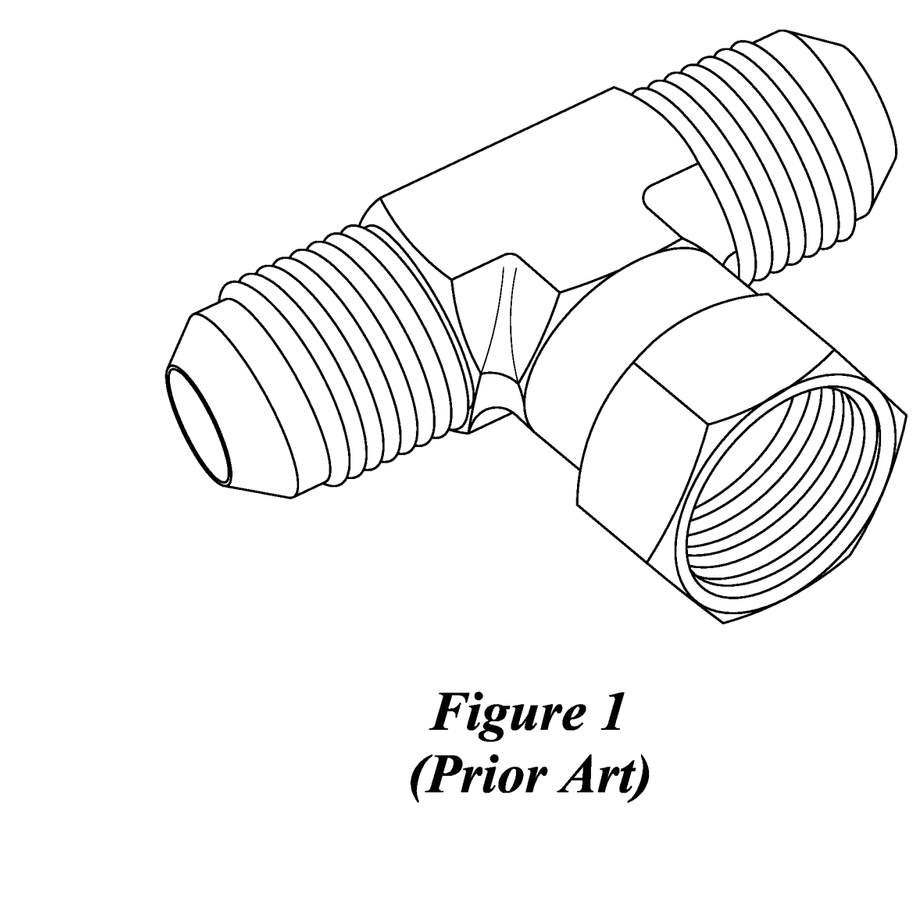
FIG. 1 is a perspective view of a prior art fitting manufactured by machining a forged workpiece.
Figure 2:
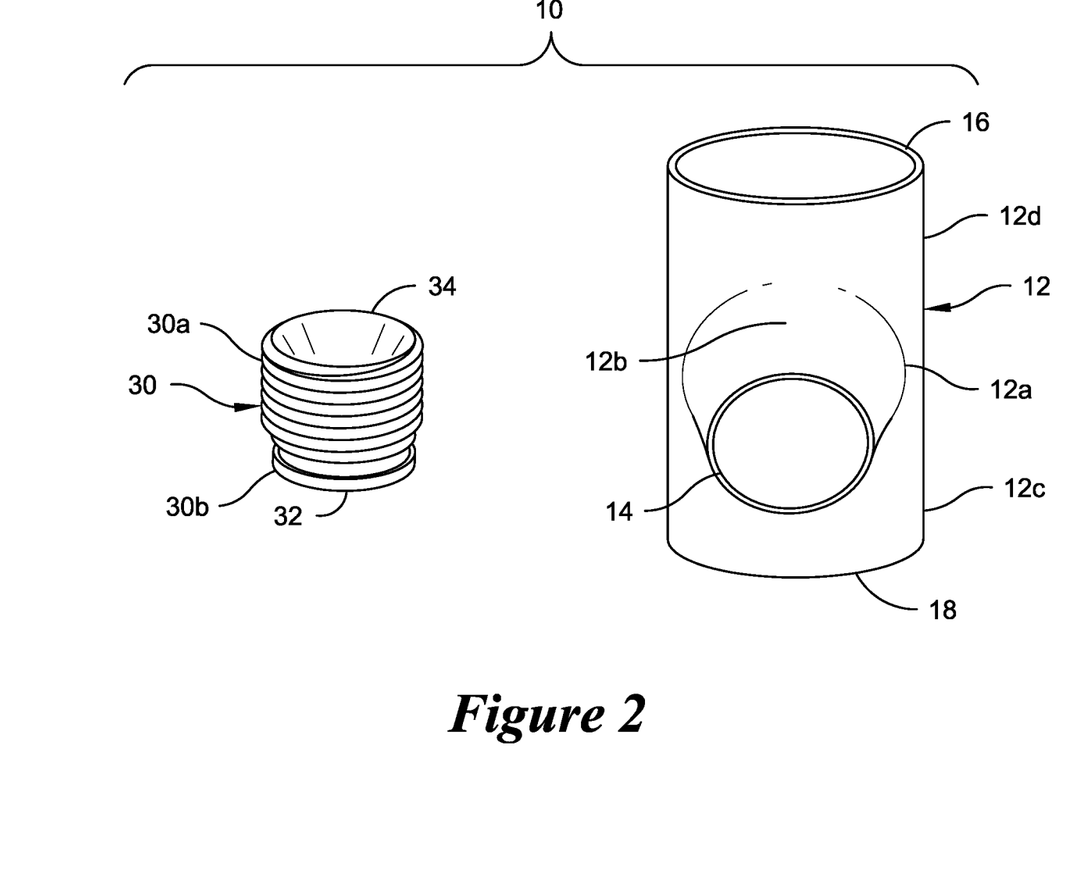
FIG. 2 is a perspective view of disconnected components of a preferred embodiment of the fitting assembly of the invention.
Figure 3:
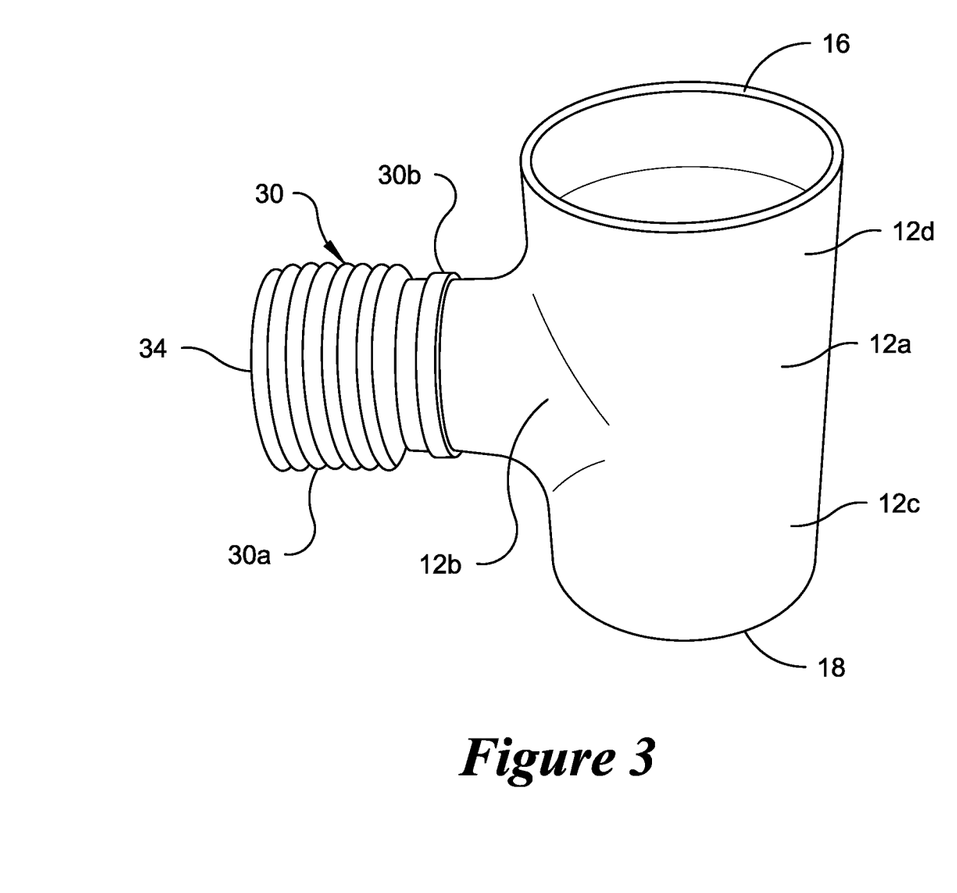
FIG. 3 is a perspective view of the components of FIG. 2 connected to form an assembly in accordance with a preferred embodiment of the invention.

A hybrid fluid-flow fitting assembly in accordance with a first preferred embodiment is illustrated in FIGS. 2-3 and is designated by reference numeral 10. The assembly 10 generally comprises a base fitting 12 and a custom fitting 30 that are connected at overlapping fluid-flow ports. In one preferred embodiment, the base fitting 12 is tee shaped and has a central body portion 12a, an input leg 12b, and two output legs 12c, 12d. An input port 14 is formed at the end of the input leg 12b. Opposed output ports 16, 18 are formed at the end of the output legs 12c, 12d, respectively. The base portion 12a and legs 12b, 12c, 12d form fluid-flow channels connecting the ports.

In this embodiment, the base fitting is depicted as a tee. However, it should be appreciated to those skilled in the art that the base fitting could have a variety of other shapes without departing from the scope of the invention. For example, in other embodiments, the base fitting could be a cross, a wye, or a straight, smooth bore reducer or expander.

In a preferred embodiment, the base fitting 12 is formed from a thin sheet of metal or thin-walled tubing to reduce the weight of the assembly 10, which is especially important for aircraft and aerospace applications. The preferred material for base fitting will depend on its application; however, some preferred materials include austenitic stainless steels, such as 321 and 347 grades, various titaniums (commercially pure, 3AI-2.5V), nickel alloys, such as 625 and 718 grades, 3003 and 6061-0 aluminums. The base fitting 12 may be formed from known techniques; however, in the preferred embodiment shown in FIGS. 2-3, the base fitting 12 is made by axial load bulge forming ("ALBF") from a sheet of metal or tubing. By using ALBF, the base fitting can have a wide variety of complex shapes.

In one preferred embodiment, the custom fitting 30 comprises a threaded nipple having a generally-cylindrical, threaded body portion 30a and an input collar 30b. An output port 32 is formed at the end of the output collar 30b and is defined by the inner and outer walls of the collar. An input port 34 is formed at the opposed end of the body portion 30a. The inner and outer diameters of the port are defined by the inner and outer walls of the input collar 30b. The ports 32, 34 are connected by an internal fluid-flow channel extending through the body portion 30a and collar 30b. As described below, the inner diameter of the output port 32 in the parent shape is slightly smaller than the outer diameter of the input ports 14 of the base fitting.

In a preferred embodiment, the custom fitting 30 is made from a shaped-memory alloy ("SMA") such as Nitonol or Tinel (titanium nickel alloy), which has a transition temperature of about minus 150° F. The custom fitting 30 has a parent shape and a martensitic shape. The parent shape is the shape of the fitting 30 at room temperature after the cast workpiece has been machined to its final dimensions and finish. In the parent shape, the microstructure of the fitting 30 is entirely austenitic. The martensitic shape is the shape of the fitting 30 after the fitting 30 has been cooled to a temperature below the transition temperature and deformed to increase the diameter of the internal fluid flow channel or the output port 32. In the martensitic shape, the microstructure of the fitting 30 is entirely martensitic.

The custom fitting 30 may be formed from known techniques. In a preferred embodiment shown in FIGS. 2-3, the custom fitting 30 is made by machining from a cast workpiece since SMA's are typically made by casting. However, the custom fitting 30 could be machined from an SMA made by other techniques. In other embodiments, the custom fitting could be made from other techniques such as casting.

In this embodiment, the custom fitting 30 is depicted as a nipple. However, it should be appreciated to those skilled in the art that the custom fitting could have a variety of other shapes without departing from the scope of the invention. For example, in other embodiments, the custom fitting could be a cap, union, barb, valve, etc. As described below, in a further preferred embodiment, the invention comprises a kit including a variety of custom fittings that can be connected to a standard base fitting for creating a variety of customized fitting assemblies.

Referring to FIG. 3, the base fitting 12 and custom fitting 30 are connected to form a hybrid fluid-flow fitting assembly 10. The fittings are connected generally by an interference fit between the input port 14 of the base fitting 12 and the output port 32 of the custom fitting 30. As discussed above, the inner diameter of the output port 32 in the parent shape is slightly smaller than the outer diameter of the input port 14 of the base fitting. In a preferred embodiment, the interference fit is created by first cooling the custom fitting 30 to a temperature below its transition temperature. Then, the inner diameter of the entire custom fitting 30 is expanded by known techniques, such as by using a tapered mandrel, so that its inner diameter is slightly larger than the outer diameter of the input port 14 of the base fitting 12. In an alternative embodiment, only the inner diameter of the output port 32 is deformed and enlarged. Next, the output port 32 is installed over the input port 14. Finally, the custom fitting 30 is allowed to warm to room temperature and return to its parent shape in which the inner diameter of the output port 32 is smaller than the outer diameter of the input port 14 of the base fitting. The negative size differential between the overlapping ports creates a compressive, interference fit at the port interface.

In the embodiment shown in FIGS. 2-3, the custom fitting 30 is connected to the input port of the base fitting. However, on or ordinary skill in the art should appreciate that it could also be connected to one of the output ports. Therefore, the properties and design considerations discussed below relate to any of the ports 14, 16, 18 or legs 12*b*, 12*c* or 12*d* of the base fitting.

The dimensions and material of the custom fitting are preferably designed to provide sufficient compressive force by the custom fitting 30 on the port to swage and seal against it and form a leak-proof seal. If the legs and/or ports of the base fitting are out of round when originally formed, the compressive force of the custom fitting is preferably high enough to deform the ports back to round. Because there is a limit to the amount of total tolerance the custom fitting can accommodate (percentage out of round+diameter tolerance), diameter expansion of the custom fitting in the martensitic phase should preferably be limited to about 8 percent to ensure complete recovery to the parent shape.

The dimensions of the ports of the base fitting, particularly the wall thickness, are preferably designed to provide sufficient "resistance" to the compressive force of the custom fitting 30. Preferably, the base fitting 12 should resist compression enough to allow some coining of its outer surface, which eliminates small defects in the outer surface that may create leak paths. The dimensions of the ports will vary depending on, among other things, the base fitting material and the operating conditions of the assembly, discussed below, but should be readily discernable to one of ordinary skill in the art.

In addition to providing a good seal, the interference fit and coining also provide good resistance to axial loading. For high pressure applications, such as an operating pressure up to 15,000 psi and a burst pressure of about 45,000 psi, the base fitting 12 should be formed from thick-walled tubing made from a hard material such as, for example, 625 Inconel. However, in such a case, the compressive force of the custom fitting 12 will not deform the base fitting very much and may not provide sufficient resistance to axial loading. To increase deformation and coining of the base fitting 12, the custom fitting 30 may be lined with a harder material such as, for example, 718 Inconel, which provides a harder contact surface than the SMA material.

Figure 4:
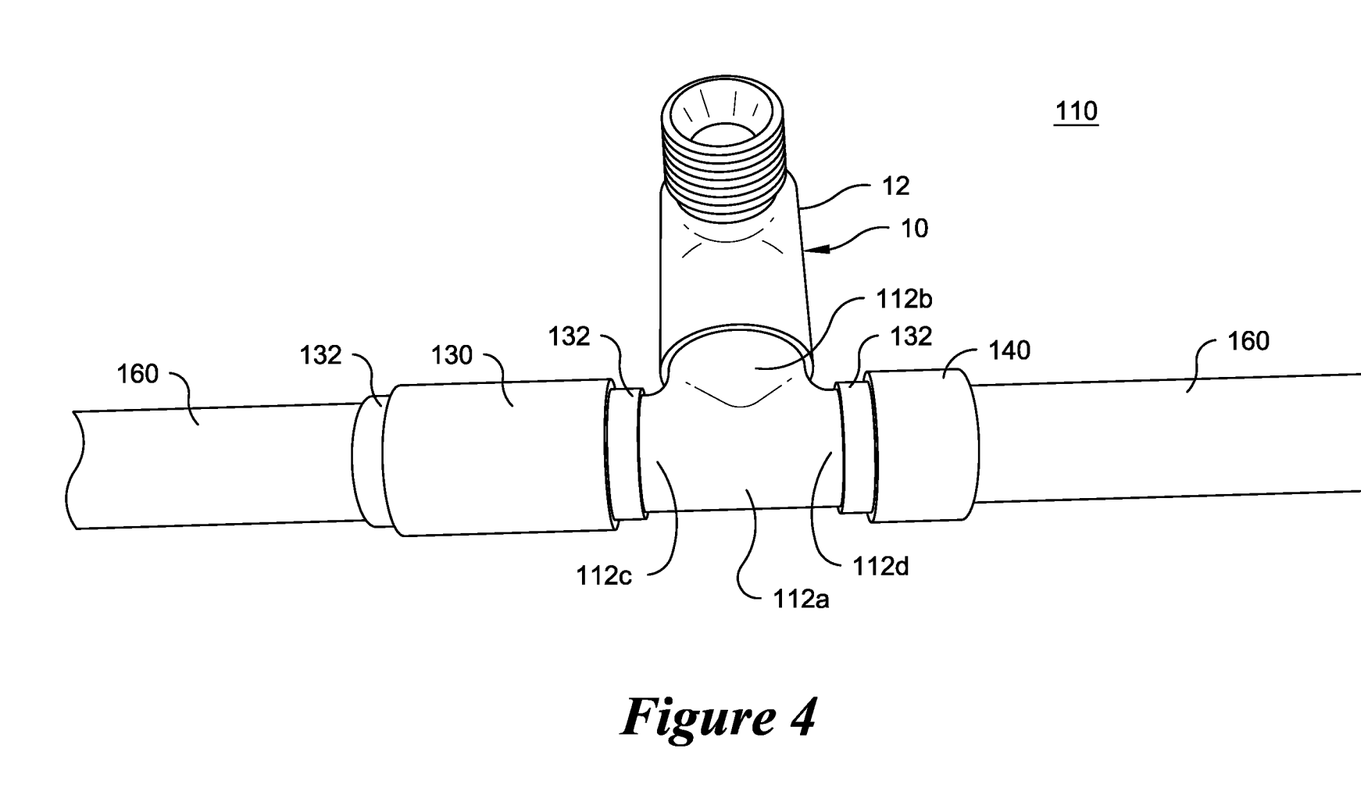
FIG. 4 is a perspective view of an assembly in accordance with another preferred embodiment of the invention; and, FIG. 5 is a perspective view of an assembly in accordance with yet a further preferred embodiment of the invention.

A hybrid fluid-flow fitting assembly in accordance with another preferred embodiment is illustrated in FIG. 4 and is designated by reference numeral 110. The assembly 110 generally comprises a base fitting 112 and a plurality of custom fittings 130, 140, which are connected at one end to the output legs 112*c*, 112*d*, respectively, of the base fitting 112, and at the other end to lengths of tubing 160. The base fitting 112 is identical in structure and manufacture as the base fitting 12 of the embodiment shown in FIGS. 2-3. In this embodiment, however, the base fitting is connected to a plurality of custom fittings 130, 140 that are provided in a kit. In a preferred embodiment, the kit includes multiple custom fittings from which the user can select to configure a custom assembly.

Similar to the custom fitting 30 described above, each custom fitting 130, 140 is made from a SMA and has an input port that connects by an interference fit with a port on the base fitting 112. Referring to FIG. 4, the two custom fittings 130, 140 comprise a long and short coupling, respectfully, having a dry film lubricant 132 applied to the inner diameter of at least one end of the coupling. The couplings are connected to the base fitting 112 and tubing lengths 160 using the same cooling/deforming/heating method described above with respect to the custom fitting 30 of FIGS. 2-3. The SMA couplings swage and coin the overlapping outer surfaces of the base fitting 112 and tubing sections 160 in the same manner as described with respect to the embodiment of FIGS. 2-3.

In this embodiment of the assembly 110, the input leg 112*b* of the base fitting 112 is connected to another fitting assembly, which in this embodiment comprises the same assembly 10 described in FIGS. 2-3. In this embodiment, the base 112 and base 12 are made from the same material and are connected using prior art techniques such as swaging, welding, etc.

Figure 5:
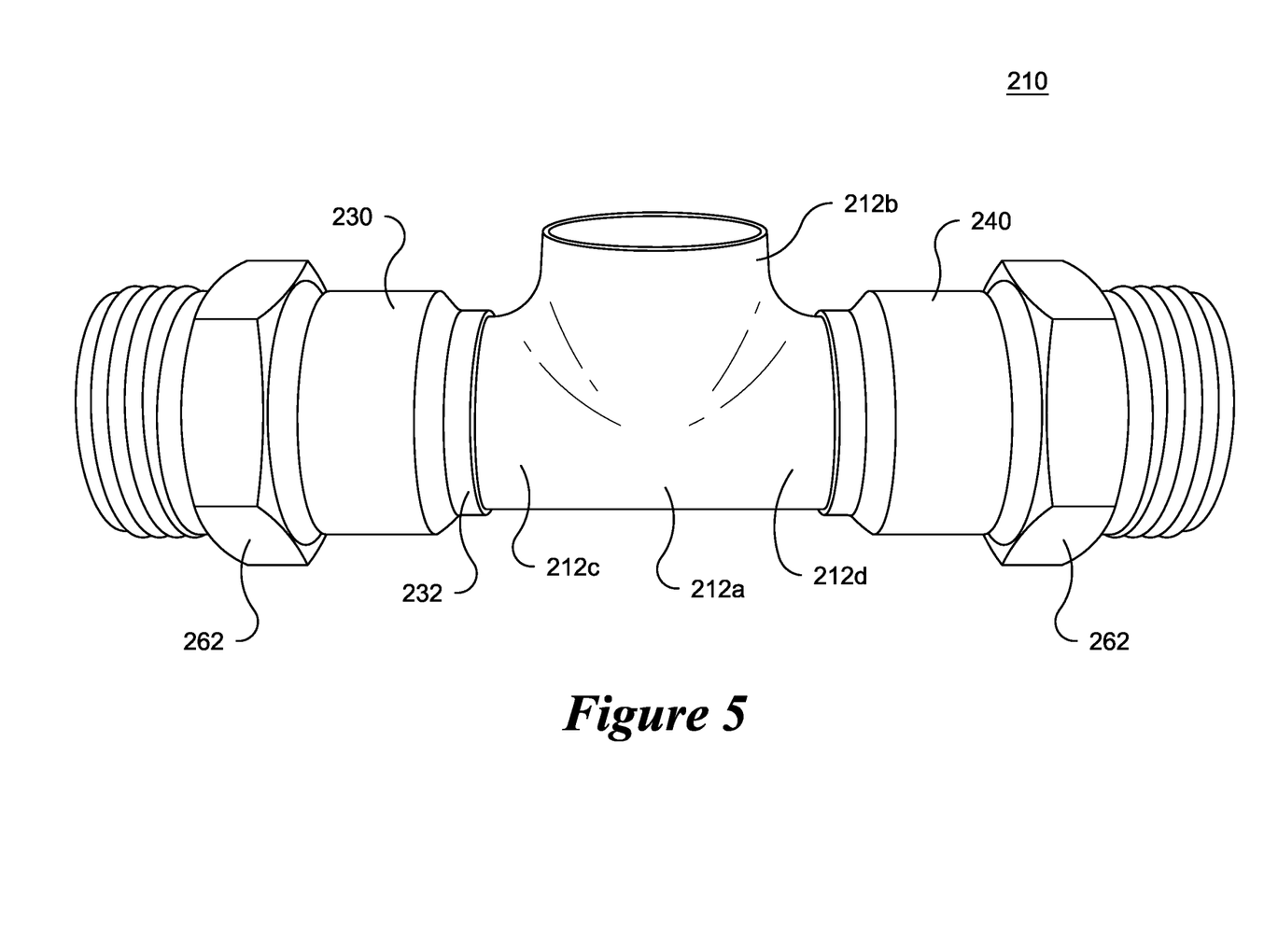

A hybrid fluid-flow fitting assembly in accordance with another preferred embodiment is illustrated in FIG. 5 and is designated by reference numeral 210. The assembly 210 generally comprises a base fitting 212 and a plurality of custom fittings 230, 240, which are connected at one end to the output legs 212*c*, 212*d*, respectively, of the base fitting 212, and at the other end to additional fittings 262, which in this preferred embodiment, comprise beam seal adapters. The base fitting 212 is identical in structure and manufacture as the base fitting 12 of the embodiment shown in FIGS. 2-3. In this embodiment, however, the base fitting 12 is connected to a plurality of custom fittings 230, 240 that are provided in a kit. In a preferred embodiment, the kit includes multiple custom fittings from which the user can select to configure a custom assembly.

Similar to the custom fitting 30 described above, each custom fitting 230, 240 is made from a SMA and has an input port that connects by an interference fit with a port on the base fitting 212 and a port on the adaptors 262. Referring to FIG. 5, each of the two custom fittings 230, 240 comprises a coupling having a dry film lubricant 232 applied to the inner diameter of at least one end of the coupling. The couplings are connected to the base fitting 212 and the adapters 262 using the same cooling/deforming/heating method described above with respect to the custom fitting 30 of FIGS. 2-3 and includes a central body portion 212*a* and an input leg 212*b*. The SMA couplings swage and coin the overlapping outer surfaces of the base fitting 212 and adapters 260 in the same manner as described with respect to the embodiment of FIGS. 2-3.

The inventive assemblies, kit and assembly methods described above provide significant advantages over and solve several shortcomings of the prior. The invention provides a quick, inexpensive and secure connection between fittings made of different materials and made by different manufacturing methods. Since the base fittings are preferably formed by ALBF, the base fitting can have a unique and/or complex shape and be made from minimal material, which reduces overall weight compared to fittings machined from forgings.

ALBF fittings also typically have a smoother surface compared to fittings machined from forgings. Therefore, the inventive assemblies have a smoother flow path compared to prior art fitting assemblies.

The compressive connection method of swaging and coining provided by the SMA fitting allows the base fitting to be connected to a variety of fittings having disparate material composition, disparate construction, and/or a disparate production method. For example, the novel fitting assembly may include both lightweight, thin-walled components and thick-walled components.

Thin-walled fittings made by ALBF often have legs that are out-of-round, have surface imperfections, are short, and/or have non-uniform wall thicknesses. These limitations make ALBF fittings difficult or impossible to weld or connect to swage fittings. The connection method of the invention easily and reliably connects a thin-walled ALBF fitting to another custom fitting without welding or using prior art swage fittings.

It is to be understood that the description, specific examples and data, while indicating exemplary embodiments, are given by way of illustration and are not intended to limit the present invention. Various changes and modifications within the present invention will become apparent to the skilled artisan from the discussion, disclosure and data contained herein, and thus are considered part of the invention.

The invention claimed is:

1. A hybrid fluid-flow assembly, comprising:
   a) a base, fluid-flow fitting that has been formed by axial load bulge forming from a thin sheet of metal, having an input port, an output port, and a fluid-flow channel connecting said input and output ports;
   b) a custom, fluid-flow fitting that has been machined from a shaped-memory alloy, having a parent shape, a martensitic shape, an input port, an output port, and a fluid-flow channel connecting said input and output ports of said custom fitting;
   wherein at least one of said input and output ports of said custom fitting has an inner diameter in said port's martensitic shape larger than the outer diameter of at least one of said output and input ports of said base fitting, respectively,
   wherein said at least one port of said custom fitting is connected at an interface to said at least one port of said base fitting to form a leak-free seal;
   wherein the compressive force of said custom fitting at the connection interface is great enough to deform said port of said base fitting from out-of-round back to round; and,
   wherein the compressive resistance of said base fitting at the connection interface is great enough to coin said port of said base fitting.

2. The assembly recited in claim 1, wherein said at least one port of said base fitting was out-of-round prior to forming the interference fit and said custom fitting deformed said at least one out-of-round port back to round.

3. The hybrid fluid-flow assembly recited in claim 2, wherein the diameter expansion of said output port of said custom fitting in the martensitic phase is less than or equal to 8 percent.

4. The assembly recited in claim 1, wherein said custom fitting has been machined from a cast, shaped-memory alloy.

5. The assembly recited in claim 1, wherein said output port of said custom fitting is connected in said port's parent condition to said input port of said base fitting.

6. The assembly recited in claim 1, wherein said custom fitting and base fitting are made from dissimilar materials.

7. The assembly recited in claim 1, wherein the wall thickness of said at least one port of said base fitting is non-uniform.

8. The assembly recited in claim 1, wherein said base fitting and custom fitting are made from materials that are not weldable together.

9. The hybrid fluid-flow assembly recited in claim 1, including a second custom, fluid-flow fitting that has been machined from a shaped-memory alloy, having a parent shape, a martensitic shape, an input port, an output port, and a fluid-flow channel connecting said input and output ports of said second custom fitting;
   wherein at least one of said input and output ports of said second custom fitting has an inner diameter in said port's martensitic shape larger than the outer diameter of at least one of said output and input ports of said base fitting, respectively;
   wherein said at least one port of said second custom fitting is connected at an interface to said at least one port of said base fitting to form a leak-free seal;
   wherein the compressive force of said second custom fitting at the connection interface is great enough to deform said port of said base fitting from out-of-round back to round; and,
   wherein the compressive resistance of said base fitting at the connection interface with the second custom fitting is great enough to compress any surface defects on base fitting at the interface.

10. The hybrid fluid-flow assembly recited in claim 1, wherein said custom fitting is lined with a material that is harder than the shape-memory material.

11. The hybrid fluid-flow assembly recited in claim 1, wherein said custom fitting is lined with a material that is harder than the sheet of metal from which the base fitting is formed.

* * * * *